United States Patent
Fox et al.

(10) Patent No.: US 8,951,159 B2
(45) Date of Patent: Feb. 10, 2015

(54) DIFFERENTIAL CASE HAVING LOCK PINS IN-LINE WITH CLUTCH EAR GUIDES

(71) Applicant: Eaton Corporation, Cleveland, OH (US)

(72) Inventors: Matthew G. Fox, Ceresco, MI (US); Jeffrey A. Oesch, Roseville, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/049,513

(22) Filed: Oct. 9, 2013

(65) Prior Publication Data

US 2014/0141921 A1 May 22, 2014

Related U.S. Application Data

(60) Provisional application No. 61/712,239, filed on Oct. 10, 2012, provisional application No. 61/843,592, filed on Jul. 8, 2013, provisional application No. 61/843,623, filed on Jul. 8, 2013, provisional application No. 61/870,832, filed on Aug. 28, 2013.

(51) Int. Cl.
*F16H 48/22* (2006.01)
*F16H 48/20* (2012.01)

(52) U.S. Cl.
USPC .......................... 475/231; 475/220; 74/606 R

(58) Field of Classification Search
USPC ................. 475/204, 220, 231, 241; 74/606 R
See application file for complete search history.

(56) References Cited

U.S. PATENT DOCUMENTS

| | | | | |
|---|---|---|---|---|
| 5,897,453 | A | * | 4/1999 | Mimura ........................ 475/246 |
| 6,063,000 | A | * | 5/2000 | Sugimoto ..................... 475/231 |
| 6,238,315 | B1 | * | 5/2001 | Morse et al. .................... 475/88 |
| 6,293,891 | B1 | | 9/2001 | Irwin et al. |
| 7,695,392 | B2 | * | 4/2010 | Isken et al. .................... 475/230 |
| 7,758,462 | B2 | | 7/2010 | Veldman et al. |
| 7,942,780 | B2 | * | 5/2011 | Donofrio et al. .............. 475/231 |
| 8,544,174 | B2 | | 10/2013 | Isken, II et al. |
| 8,591,375 | B2 | | 11/2013 | Maruyama et al. |
| 2010/0323840 | A1 | | 12/2010 | Radzevich et al. |
| 2013/0225356 | A1 | | 8/2013 | Tanaka et al. |

FOREIGN PATENT DOCUMENTS

| | | | |
|---|---|---|---|
| EP | 0182936 A1 | * | 6/1986 |
| GB | 1312720 | * | 4/1973 |
| GB | 2237853 A | * | 11/1990 |

* cited by examiner

*Primary Examiner* — Roger Pang
(74) *Attorney, Agent, or Firm* — Remarck Law Group PLC

(57) ABSTRACT

A differential gear mechanism constructed in accordance to one example of the present disclosure can include a differential case, a clutch pack and a plurality of lock pins. The differential case can include a first differential case portion that defines a first output shaft opening and includes a plurality of clutch ear guides and a plurality of lock pin engaging surfaces. The clutch pack can include a plurality of annular plates that are interleaved between a plurality of annular friction disks. At least one of the annular plates and annular friction disks can include a plurality of radially extending plate ears that are received by the corresponding plurality of clutch ear guides. The plurality of lock pins can be received by the plurality of first lock pin engaging surfaces of the first differential case at locations in-line with the clutch ear guides.

20 Claims, 12 Drawing Sheets

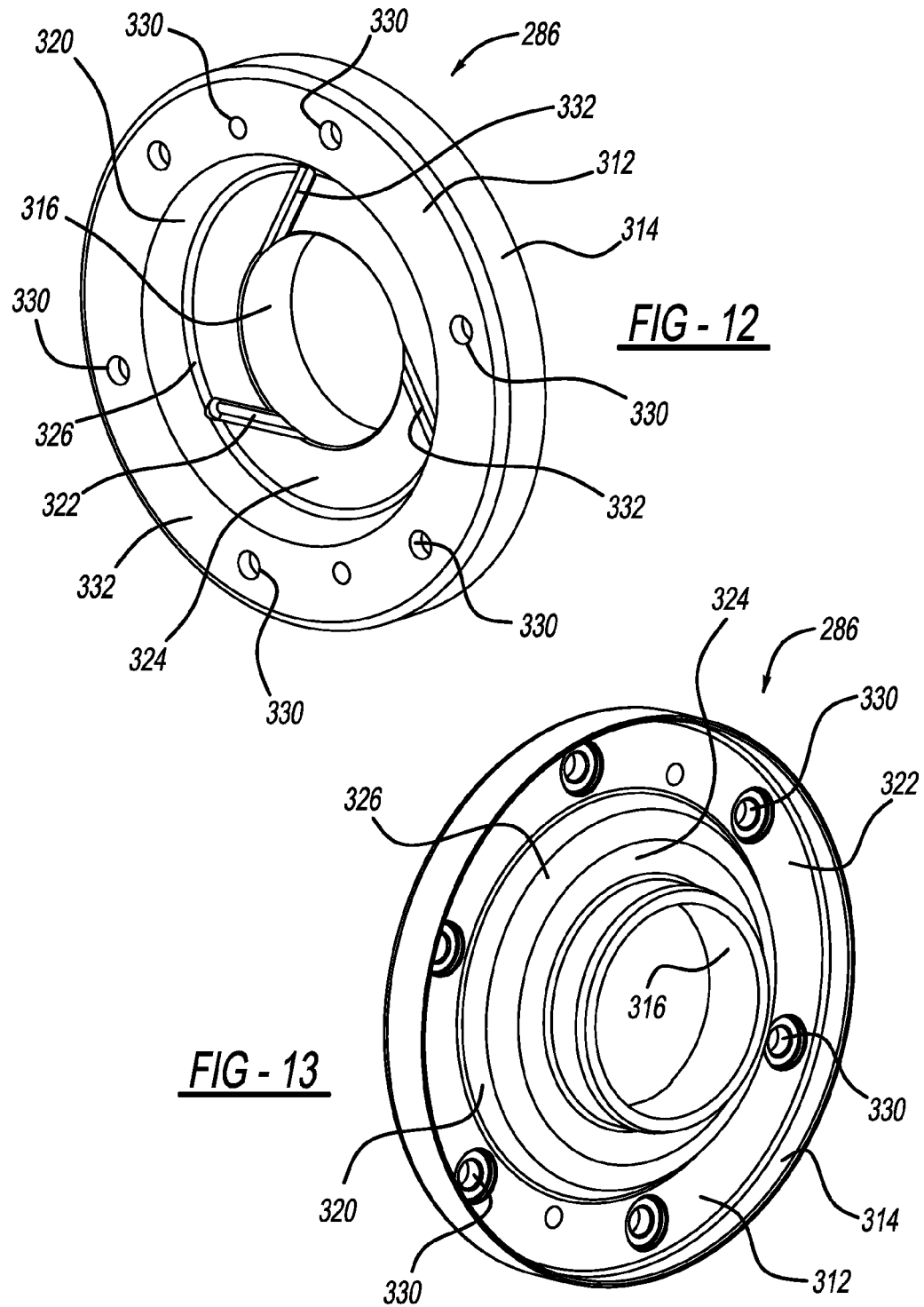

DIFFERENTIAL CASE HAVING LOCK PINS IN-LINE WITH CLUTCH EAR GUIDES

CROSS-REFERENCE TO RELATED APPLICATIONS

This application claims the benefit of U.S. Provisional Application No. 61/712,239 which was filed on Oct. 10, 2012, U.S. Provisional Application Nos. 61/843,592 and 61/843,623, which were filed on Jul. 8, 2013, and U.S. Provisional Application No. 61/870,832 filed Aug. 28, 2013. The disclosures of each of the above applications are incorporated herein by reference in their entirety.

FIELD

The present disclosure relates generally to differential gear mechanisms and more particularly to a differential case having lock pins configured to be in-line with ear guides extending from corresponding clutch plates.

BACKGROUND

A differential gear mechanism can be provided in an axle assembly and used to transfer torque from a driveshaft to a pair of output shafts. The driveshaft can drive the differential through the use of a bevel gear that meshes with a ring gear mounted to a housing of the differential. In automotive applications, a differential allows the tires mounted at either end of the axle assembly to rotate at different speeds. This is important when the vehicle is turning because the outer tire travels over an arc of greater distance than the inner tire. Thus, the outer tire must rotate at a faster speed than the inner tire to compensate for the greater distance of travel. The differential includes a differential case and a gear arrangement that allows torque to be transferred from the driveshaft to the output shafts while concurrently allowing the output shafts to rotate at different speeds as needed. The gear arrangement can generally include a pair of side gears that are mounted for rotation with the respective output shafts. A series of cross pins or pinion gear shafts are fixedly mounted to the differential case for rotation therewith. A corresponding plurality of pinion gears are mounted for rotation with the pinion gear shafts and are in meshing relationship with both of the side gears.

Some differential gear mechanisms include traction modifying differentials. Typically, a clutch pack can be disposed between one of the side gears and an adjacent surface of the differential case. The clutch pack or locking mechanism is operable to limit relative rotation between the gear case and the one side gear. In such differentials, engaging the clutch pack or locking mechanism (retarding differentiation) is achieved by one of several different approaches. Some configurations include a piston that actuates to cause the clutch pack to move between open, locked and partially locked conditions. In some examples it is challenging to configure the differential case to accommodate the required components while optimizing packaging space on the vehicle.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A differential gear mechanism constructed in accordance to one example of the present disclosure can include a differential case, a clutch pack and a plurality of lock pins. The differential case can include a first differential case portion that defines a first output shaft opening and includes a plurality of clutch ear guides and a plurality of lock pin engaging surfaces. A second differential case portion defines a second output shaft opening. The clutch pack can include a plurality of annular plates that are interleaved between a plurality of annular friction disks. At least one of the annular plates and annular friction disks can include a plurality of radially extending plate ears that are received by the corresponding plurality of clutch ear guides. The plurality of lock pins can be received by the plurality of first lock pin engaging surfaces of the first differential case at locations in-line with the clutch ear guides. The lock pins can be disposed between the first and second differential case portions and be configured to inhibit relative rotation of the first and second differential case portions.

According to additional features, each of the plurality of clutch ear guides can be defined along a clutch ear guide axis. Each of the plurality of first lock pin engaging surfaces can be defined along a first lock pin engaging surface axis. Each clutch ear guide axis and corresponding first lock pin engaging surface axis can be collinear. In one configuration, all of the plurality of annular plates of the clutch pack include a plurality of radially extending plate ears. The plurality of radially extending plate ears can extend along a corresponding plurality of longitudinal plate ear axes. At least one plate ear axis can intersect at least one lock pin. In another configuration, each plate ear axis of the plurality of longitudinal plate ear axes intersects a lock pin. The second differential case portion can include a plurality of second lock pin engaging surfaces. The plurality of lock pins can be received by the plurality of second lock pin engaging surfaces. The second lock pin engaging surfaces can be defined by blind bores formed in the second differential case portion.

According to still other features, the lock pins can be unthreaded. A plurality of fasteners can threadably couple the first and second differential case portions together. Each lock pin can be located radially adjacent to an adjacent fastener.

A differential gear mechanism constructed in accordance to other features of the present disclosure can include a differential case, a clutch pack and a plurality of lock pins. The differential case can include a first differential case portion that defines a first output opening and includes a plurality of clutch ear guides and a plurality of first lock pin engaging surfaces. A second differential case portion can define a second output shaft opening. The clutch pack can have a plurality of annular plates interleaved between a plurality of annular friction disks. The clutch pack can include a plurality of radially extending plate ears that are received by the corresponding plurality of clutch ear guides. The plurality of radially extending plate ears can be defined along a corresponding plurality of longitudinal plate ear axes. The plurality of lock pins can be received by the plurality of first lock pin engaging surfaces of the first differential case. The lock pins can be disposed between the first and second differential case portions and be configured to inhibit relative rotation of the first and second differential case portions. The plurality of longitudinal plate ear axes can intersect a corresponding lock pin.

According to additional features, each of the plurality of clutch ear guides are defined along a clutch ear guide axis. Each of the plurality of first lock pin engaging surfaces can be defined along a first lock pin engaging surface axis. Each clutch ear guide axis and a corresponding first lock pin engaging surface axis can be collinear.

According to still other features, the second differential case portion can include a plurality of second lock pin engaging surfaces. The plurality of lock pins can be received by the plurality of second lock pin engaging surfaces. The second lock pin engaging surfaces can be defined by blind bores formed in the second differential case portion. The lock pins can be unthreaded. A plurality of fasteners can threadably couple the first and second differential case portions together. Each lock pin can be located radially adjacent to an adjacent fastener.

A differential gear mechanism constructed in accordance to additional features of the present disclosure can include a differential case, a clutch pack, a plurality of non-threaded lock pins and a plurality of fasteners. The first differential case portion can define a first output shaft opening and include a plurality of clutch ear guides and a plurality of first lock pin engaging surfaces. A second differential case portion can define a second output shaft opening and a plurality of second lock pin engaging surfaces. The clutch pack can have a plurality of annular plates interleaved between a plurality of annular friction disks. At least one of the annular plates and annular friction disks can include a plurality of radially extending plate ears that are received by the corresponding plurality of clutch ear guides. The plurality of non-threaded lock pins can be received by the plurality of first lock pin engaging surfaces of the first differential case and the plurality of second lock pin engaging surfaces of the second differential case at locations in-line with the clutch ear guides. The lock pins can be disposed between the first and second differential case portions and be configured to inhibit relative rotation of the first and second differential case portions. The plurality of fasteners can threadably couple the first and second differential case portions together.

According to additional configurations, each of the plurality of clutch ear guides can be defined along a clutch ear guide axis. Each of the plurality of first lock pin engaging surfaces can be defined along a first lock pin engaging surface axis. Each clutch ear guide axis and corresponding first lock pin engaging surface axis can be collinear. In other configurations, all of the plurality of annular plates of the clutch pack can include a plurality of radially extending plate ears. The plurality of radially extending plate ears can extend along a corresponding plurality of longitudinal plate ear axes. At least one plate ear axis can intersect at least one lock pin. Each plate ear axis of the plurality of longitudinal plate ear axes can intersect a lock pin.

BRIEF DESCRIPTION OF THE DRAWINGS

The present disclosure will become more fully understood from the detailed description and the accompanying drawings, wherein:

FIG. 12 is detail side view of the clutch pack and lock pins of FIG. 7.

DETAILED DESCRIPTION

Figure 1:
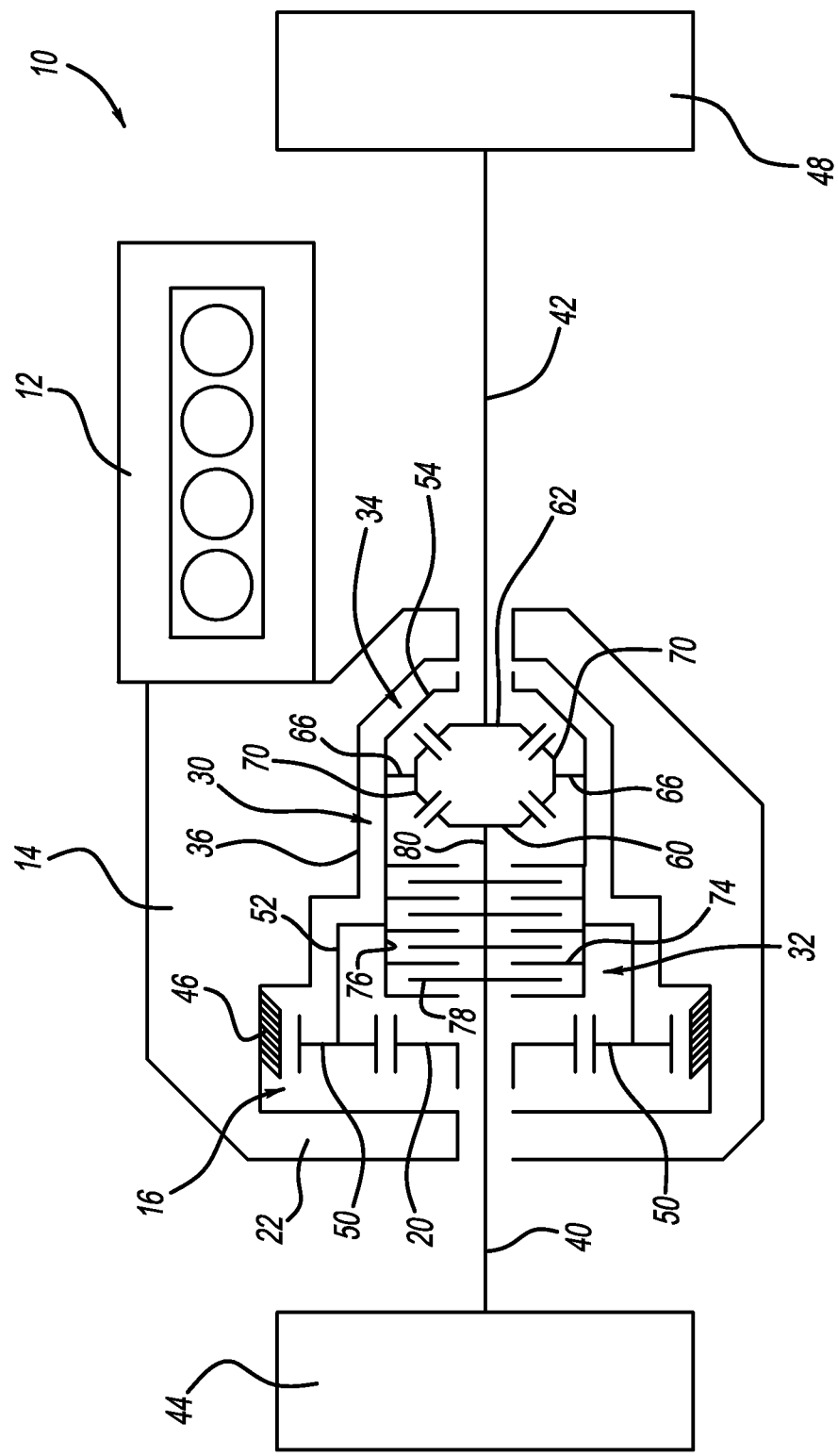
FIG. 1 is schematic of an exemplary vehicle driveline incorporating a differential gear mechanism constructed in accordance to one example of the present disclosure.

With initial reference to FIG. 1, an exemplary vehicle driveline is shown and generally identified with reference numeral 10. The exemplary vehicle driveline 10 described herein is for a front wheel drive vehicle having a transversely mounted engine 12, although other configurations can be utilized with the present disclosure. The engine 12 provides a rotary output to a transmission 14.

The driveline 10 can further include a transaxle 22 and a limited slip differential assembly 30 having a planetary gear assembly 16, a clutch assembly 32 and a differential gear assembly 34. The limited slip differential assembly 30 is received in a housing 36 and operates to drive a pair of axle shafts 40 and 42 that are connected to front drive wheels 44 and 48, respectively. In general, the limited slip differential assembly 30 functions as a traditional open differential during normal operating conditions until an event occurs where a bias torque is required. When a loss in traction is detected or anticipated, the clutch assembly 32 can be selectively actuated in order to generate the optimum bias ratio for the situation.

The transmission 14 can receive the rotary output from the engine 12 and provide a rotary input to the limited slip differential assembly 30. Further, the transmission 14 can be operable to provide various gear ratios between the rotary output of the engine 12 and the rotary input of the limited slip differential assembly 30.

The planetary gear assembly 16 includes a ring gear 46, a sun gear 20 and a plurality of planet gears 50 carried by a planet carrier 52. The ring gear 46 is non-rotatably fixed to the housing 36, and the sun gear 20 is meshingly engaged with the plurality of planet gears 50 carried by the planet carrier 52. The planet gears 50 are meshed with the ring gear 46. The planet carrier 52 is coupled for rotation with a differential case 54 of the differential gear assembly 34. The planetary gear assembly 16 provides a gear ratio reduction from the sun gear 20 to the planetary carrier 52 and, therefore, to the differential case 54. The sun gear 20 is rotatably coupled to the transmission 14 via a coupling device, such as a chain or belt, such that an output of the transmission 14 drivingly rotates the sun gear 20, which translates rotational output from the transmission 14 into rotational input of the sun gear 20.

Figure 5:
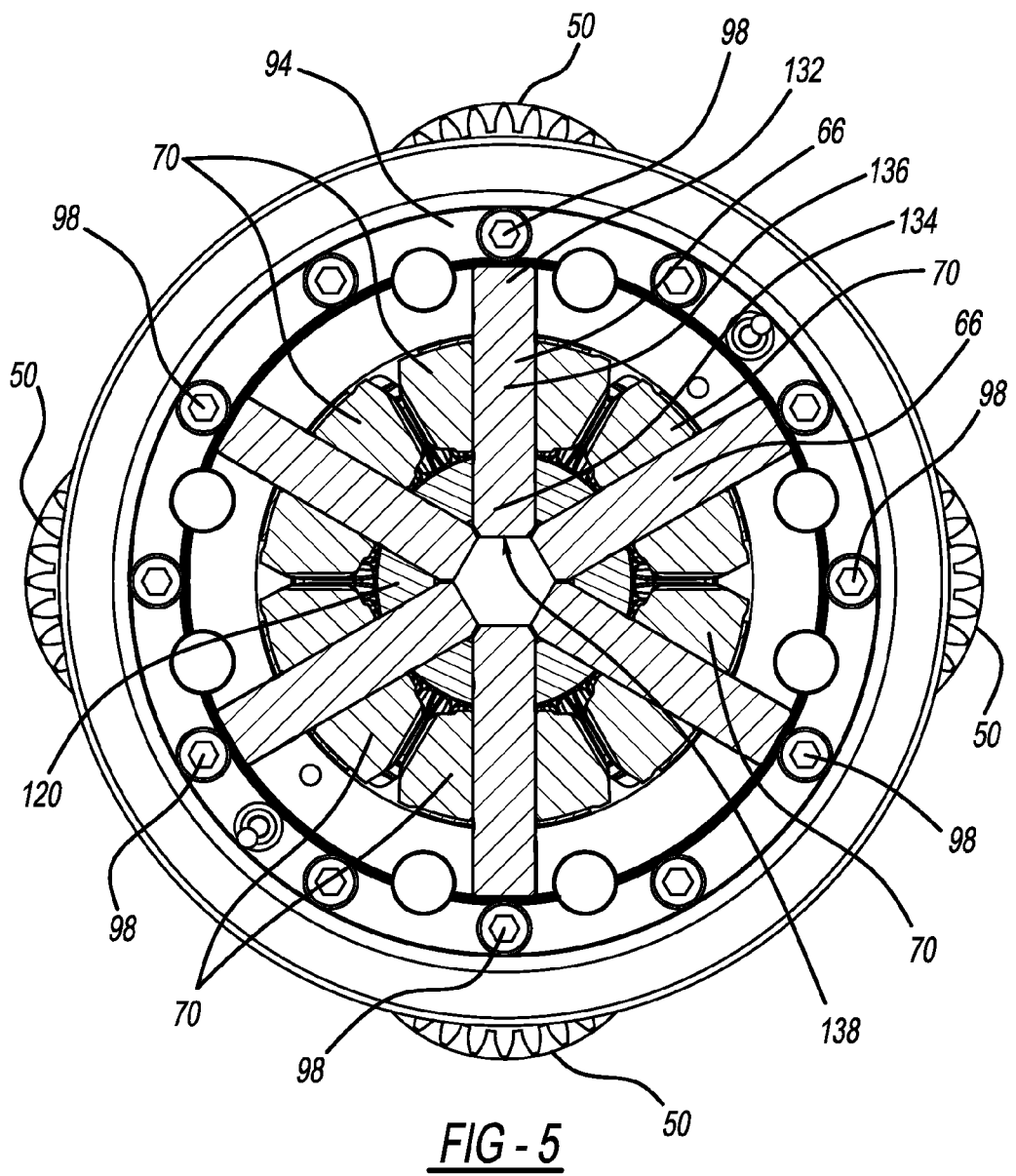
FIG. 5 is a cross-sectional view of the limited slip differential assembly taken along lines 5-5 of FIG. 2.
Figure 6:
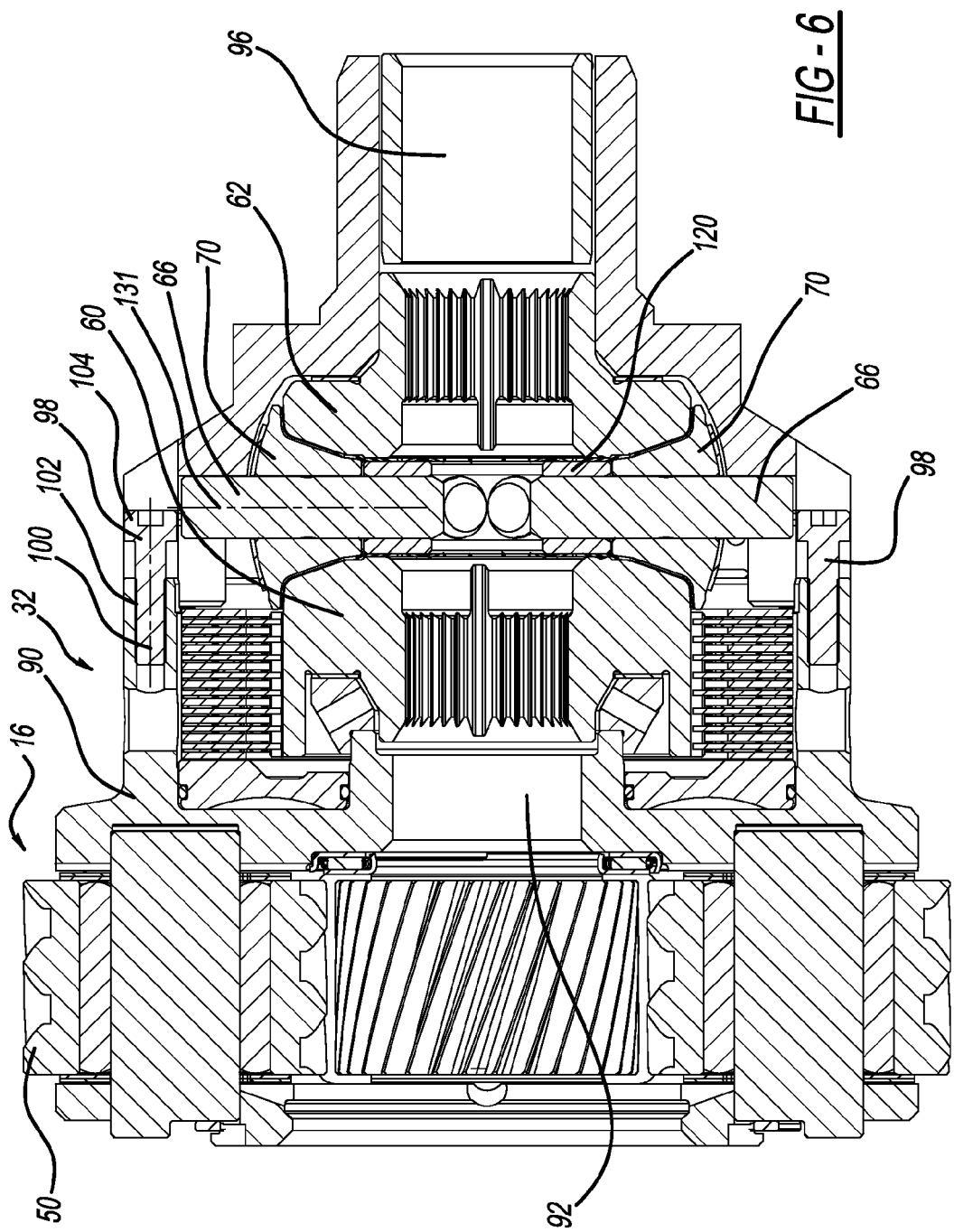
FIG. 6 is a cross-sectional view of the limited slip differential assembly taken along lines 6-6 of FIG. 4.
Figure 7:
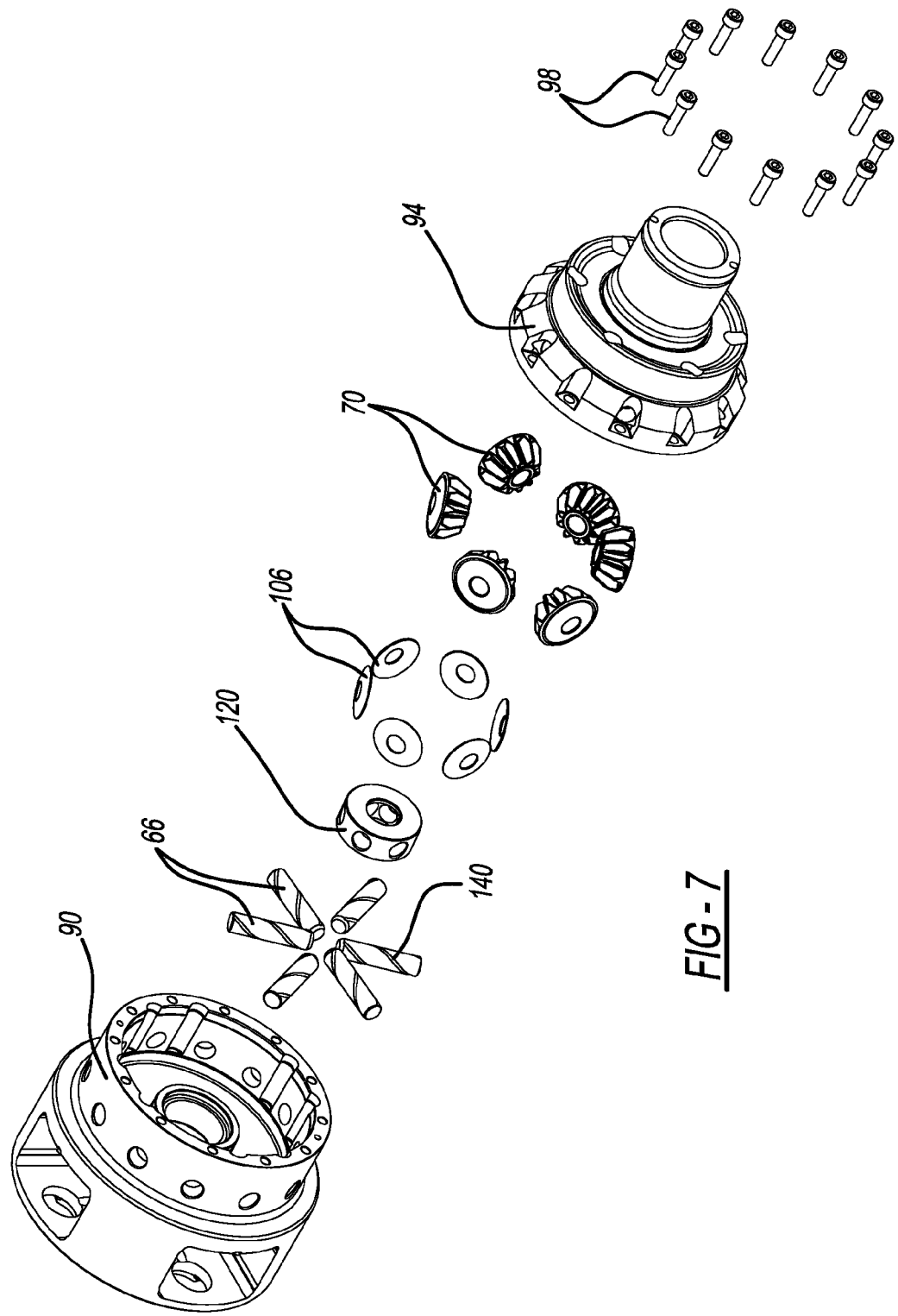
FIG. 7 is an exploded view of a clutch pack, lock pins and first and second differential case portions of the limited slip differential assembly of FIG. 2.
Figure 8:
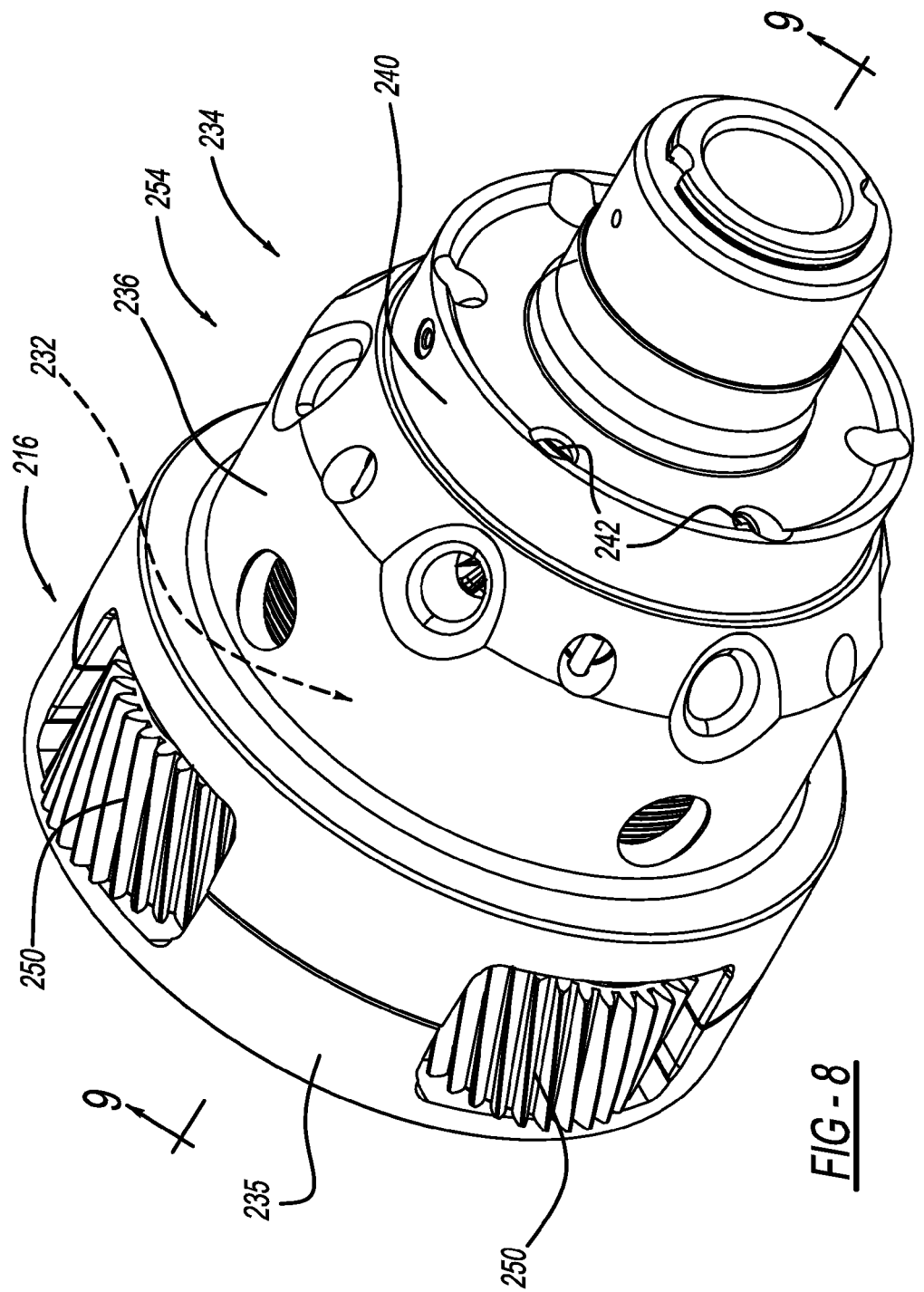
FIG. 8 is a front perspective view of the first differential case portion of FIG. 7.
Figure 9:
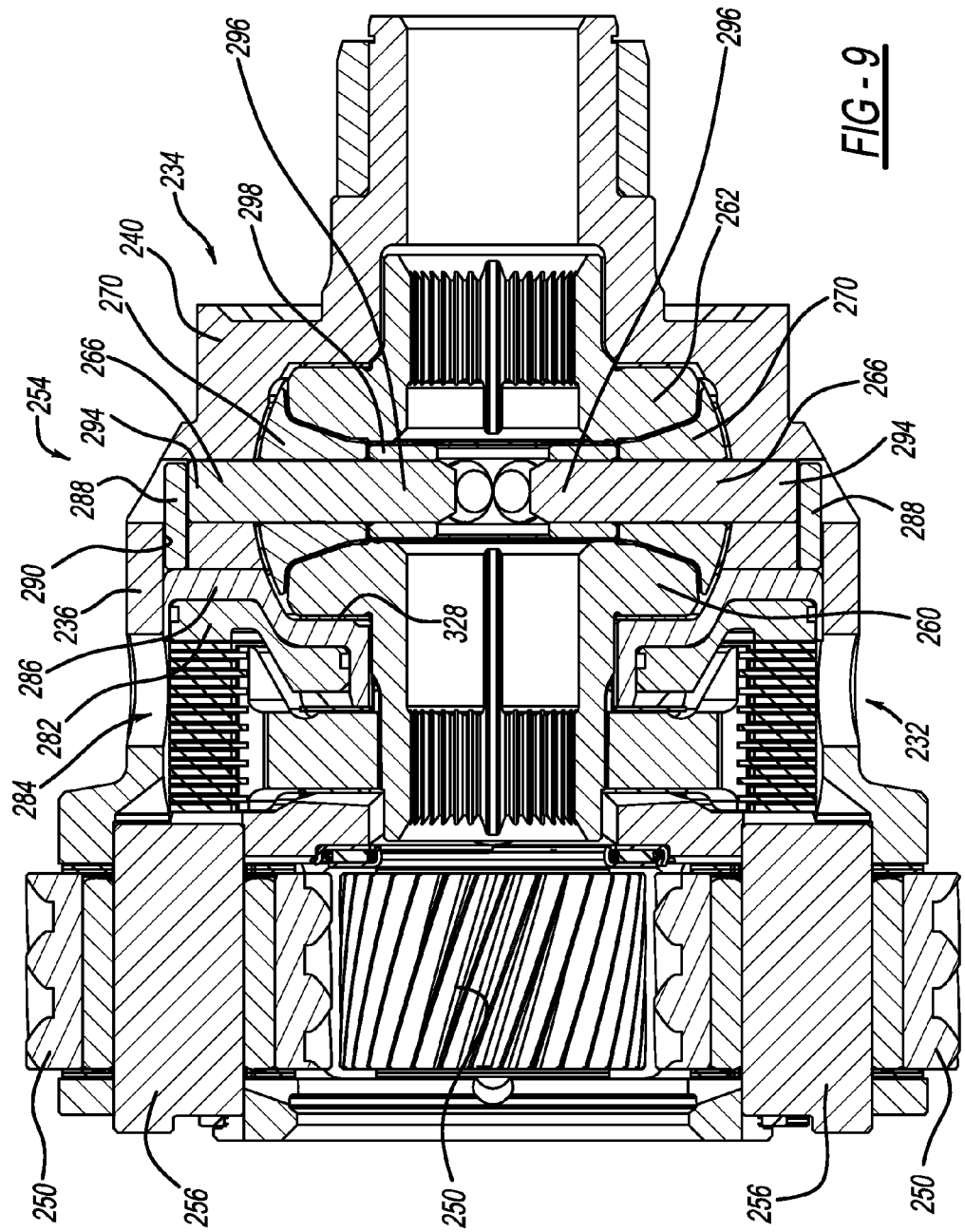
FIG. 9 is a front perspective view of a lock pin of FIG. 7.

The differential gear assembly 34 includes a pair of side gears 60 and 62 that are mounted for rotation with the axle shafts 40 and 42 (and first and second drive wheels 44 and 48), respectively. The side gears 60 and 62 define first and second axle shaft openings 64 and 65 (FIG. 5). A plurality of cross pins or pinion gear shafts 66 are fixedly mounted to the differential case 54 for rotation therewith. A corresponding plurality of pinion gears 70 are mounted for rotation with the pinion gear shafts 66 and are in meshing relationship with both of the side gears 60 and 62. In an open configuration, described more fully below, the differential gear assembly 34 acts to allow the axle shafts 40 and 42 to rotate at different speeds.

The clutch assembly 32 couples the planetary gear assembly 16 with the differential gear assembly 34. The clutch assembly 32 includes a clutch pack 72 and a clutch actuator 73. The clutch pack 72 includes a plurality of annular plates 74 interleaved between a plurality of annular friction disks 78. The plurality of annular plates 74 can be coupled for rotation with one of the differential case 54 and the differential gear assembly 34. The plurality of annular friction disks 78 can be coupled for rotation with the other one of the differential case 54 and the differential gear assembly 34. In the illustrated embodiment, the plurality of annular plates 74 are coupled for rotation to the differential case 54 (e.g., splined to an inner diameter 76 of the differential case 54) and the plurality of annular friction disks 78 are coupled for rotation with the differential gear assembly 34 (e.g., splined to an outer diameter 80 of the side gear 60). It will be appreciated that the annular friction disks 78 may be supported for rotation by either of the side gears 60 or 62, or both.

The plurality of annular plates 74 and annular friction disks 78 are interleaved between one another and act to rotate past one another in substantially non-contacting relationship when the clutch assembly 32 is in its open position. However, it will be appreciated by those skilled in the art that the term "non-contacting" as used herein is relative and is not meant to necessarily indicate that the annular plates 74 and annular friction disks 78 have absolutely no contact when the clutch assembly 32 is in the open condition. The annular plates 74 and annular friction disks 78 are axially movable into frictional engagement relative to one another, thereby reducing relative rotation between the annular plates 74 and annular friction disks 78 when the clutch assembly 32 is in the closed or partially closed configurations. In this manner, when the clutch assembly 32 is in its closed position, the side gears 60 and 62, as well as the axle shafts 40 and 42 and the drive wheels 44 and 48 rotate together.

The clutch assembly 32 can operate in an open configuration to allow the side gears 60 and 62 to rotate independently from each other, e.g., at different speeds. The clutch assembly 32 can also operate in a closed or partially closed configuration where the side gears 60 and 62 rotate together or partially together (that is, not independently), e.g., at substantially the same speed. The clutch assembly 32 can, for example, be a hydraulic clutch assembly 32 that utilizes pressurized hydraulic fluid that can act on a piston 82 to selectively actuate the clutch pack 72 between the open, closed and partially closed configurations.

Figure 2:
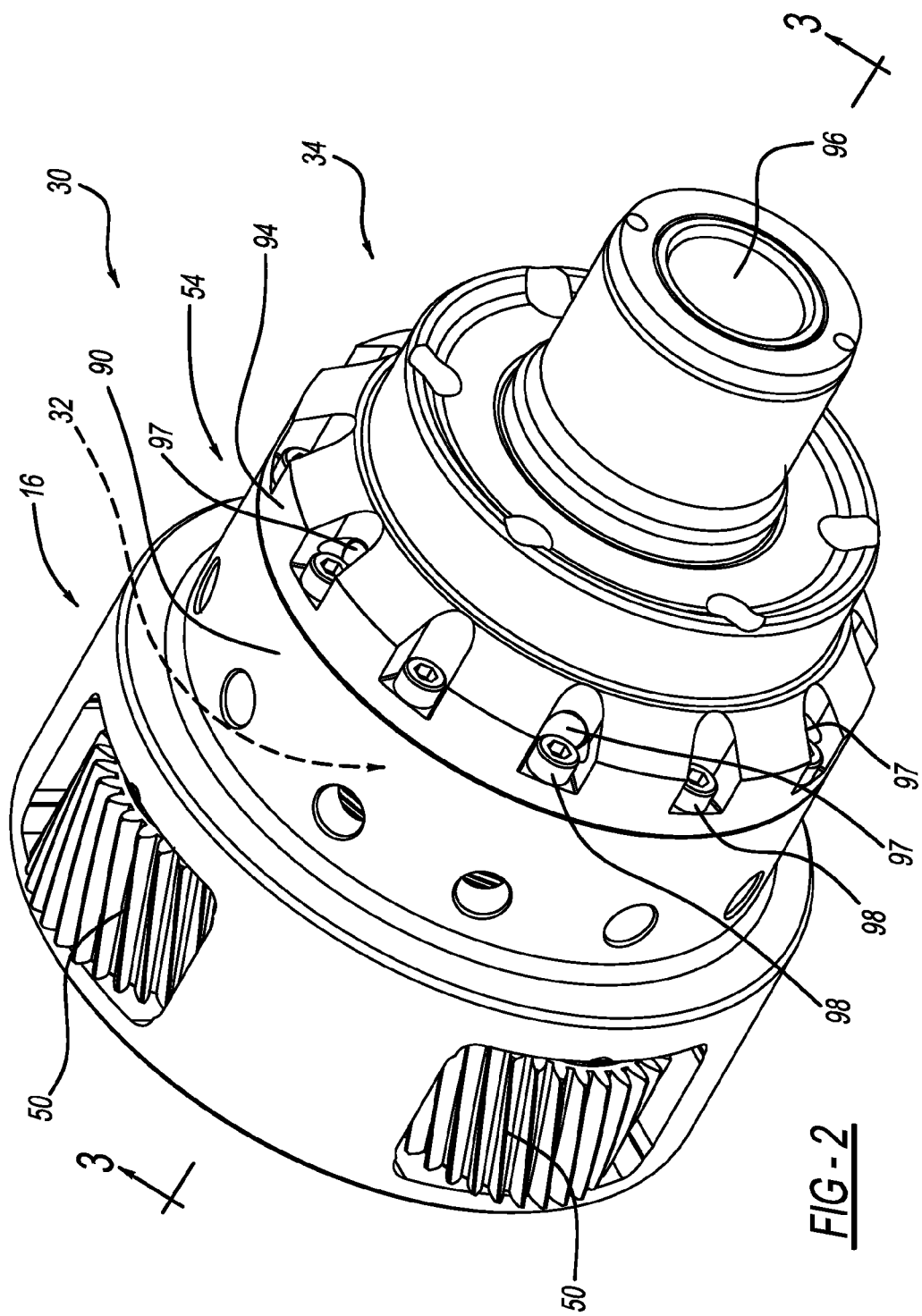
FIG. 2 is a front perspective view of a limited slip differential assembly constructed in accordance to one example of the present disclosure.
Figure 3:
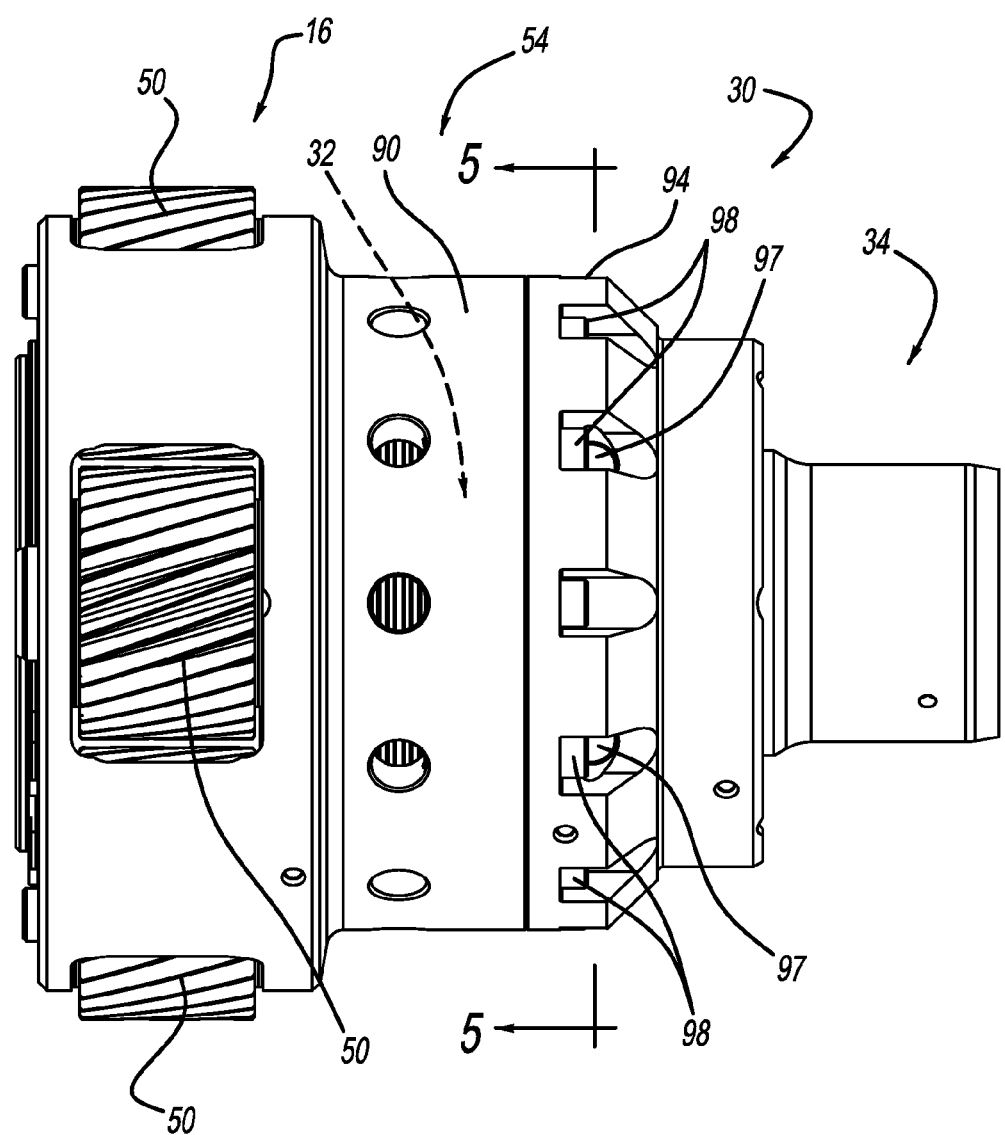
FIG. 3 is front perspective view of the limited slip differential assembly of FIG. 2 shown with the differential case in phantom view.
Figure 4:
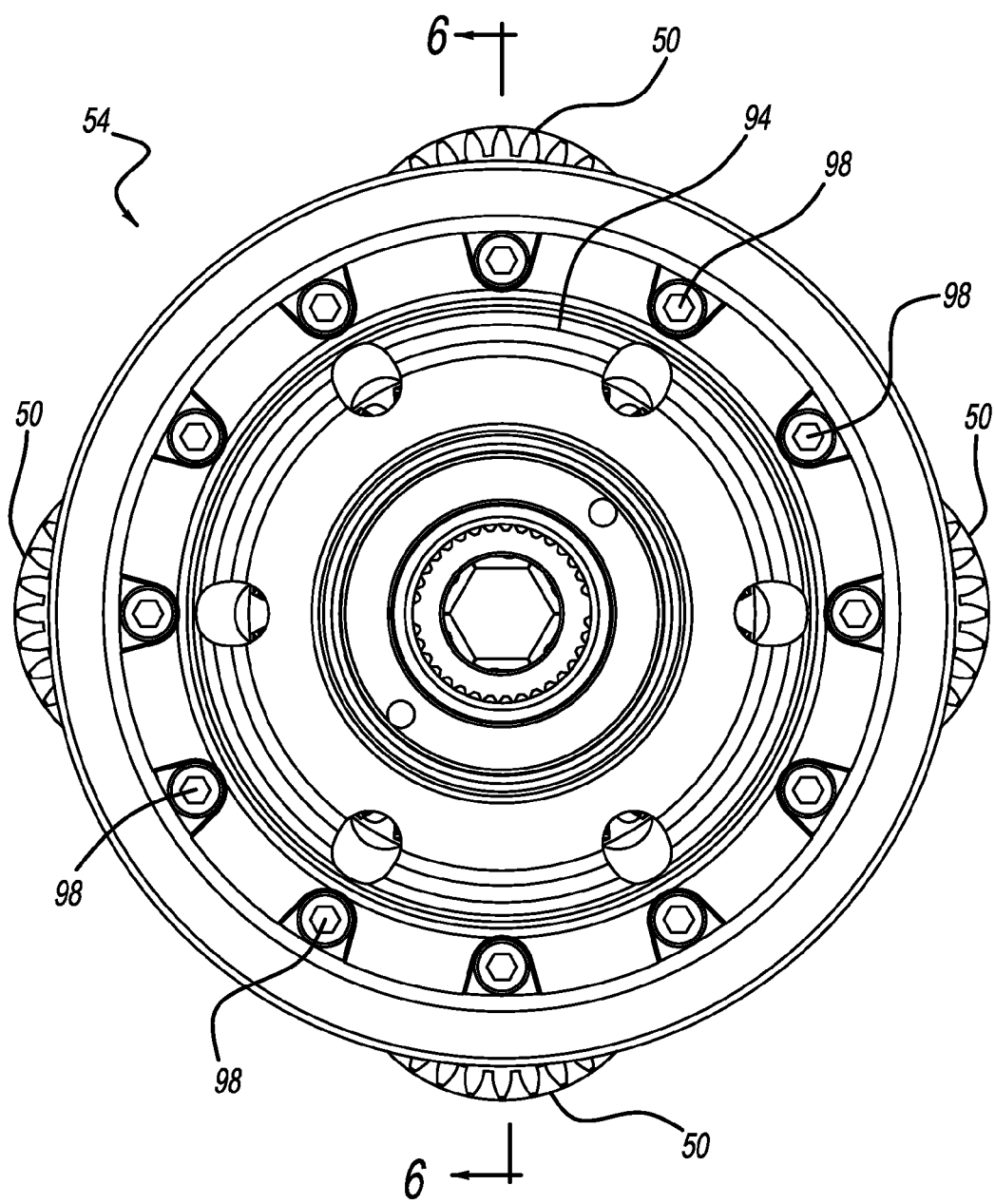
FIG. 4 is a side view of the limited slip differential assembly of FIG. 2.

With additional reference now to FIGS. 2-6, additional features of the differential gear assembly 34 will be described. The differential case 54 can include a first differential case portion 90 that defines a first output shaft opening 92 (FIG. 3) and a second differential case portion 94 that defines a second output shaft opening 96 (FIG. 2). The first and second differential case portions 90 and 94 can be coupled together by a plurality of fasteners 98. In the example shown, the fasteners include hex bolts although other configurations are contemplated.

During operation of the clutch assembly 32, the piston 82 can be caused to actuate toward and away (in a horizontal direction as viewed in FIG. 3) from the clutch pack 72. Actuation of the piston 82 can be caused by a predetermined amount of hydraulic pressure delivered to the clutch assembly 32 generating the optimum bias ratio for the situation to maintain the proper kinematic wheel speed difference as if both wheels were gripping predictably. In the example shown, actuation of the piston 82 toward an engaged position (rightward as viewed in FIG. 5) causes the annular plates 74 and the annular friction disks 78 to become frictionally engaged thereby locking the differential gear assembly 34 such that the side gears 60 and 62 rotate at the same speed.

A reaction block 150 can be disposed on the first differential case portion 190. The reaction block 150 can be configured to transfer a separation force from the first side gear 60 onto the first differential case portion 90. In this regard, the reaction block 150 and the first differential case portion 90 can provide structural support for maintaining an axial position of the side gear 60. The reaction block 150 can be nestingly received in an annular channel 154 (FIG. 5) defined in the first side gear 60. A washer 156 can be disposed in the annular channel 154 between the side gear 60 and the reaction block 150.

With reference now to FIGS. 3-12, additional features of the differential gear assembly 34 will be described. The first differential case portion 90 includes a plurality of clutch ear guides 170 (FIG. 8) that are defined along a corresponding plurality of clutch ear guide axes 172. The first differential case portion 90 further includes a plurality of first lock pin engaging surfaces 180 that are defined along a corresponding plurality of first lock pin engaging axes 182. In the example provided herein, the plurality of clutch ear guides 170 and the plurality of first lock pin engaging surfaces 180 are formed by partial circumferential surfaces in the first differential case portion 90. In the example shown, the plurality of clutch ear guide axes 172 are collinear with the corresponding plurality of first lock pin engaging axes 182.

Figure 11:
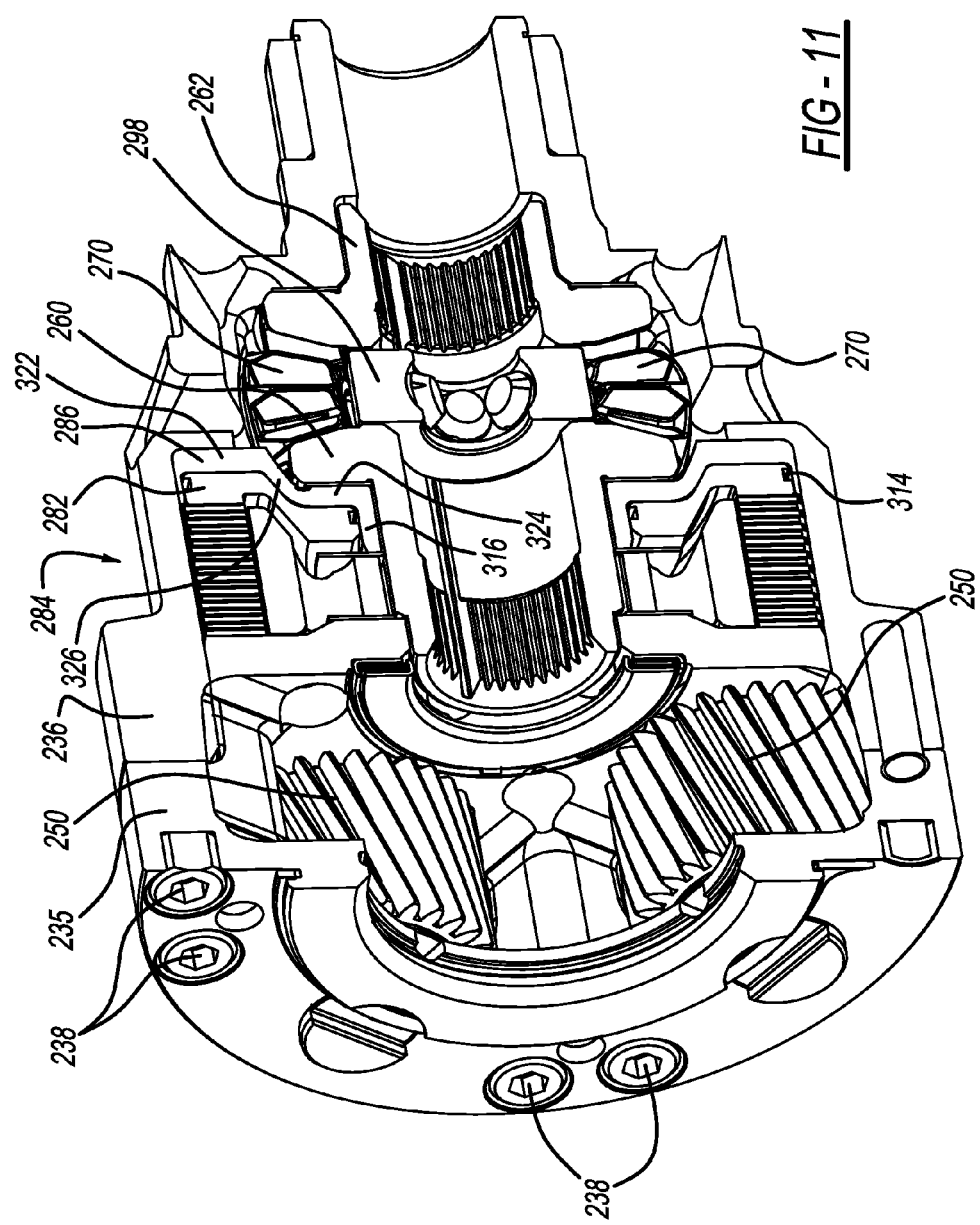
FIG. 11 is a side view of the clutch pack and lock pins of FIG. 7.

The clutch ear guides 170 are configured to receive radially extending plate ears 190 extending from the plurality of annular plates 74. In this regard, the plurality of annular plates 74 are splined for rotation with the differential case 54. Each of the radially extending plate ears 190 aligns with another radially extending plate ear 190 from an adjacent annular plate 74 along a corresponding plurality of longitudinal plate ear axes 194 (FIG. 11).

The second differential case portion 94 (FIG. 10) includes a plurality of second lock pin engaging surfaces 202. In the example shown, the plurality of second lock pin engaging surfaces 202 are formed by blind bores 204 provided in the second differential case portion 94. Other geometries are contemplated.

Figure 10:
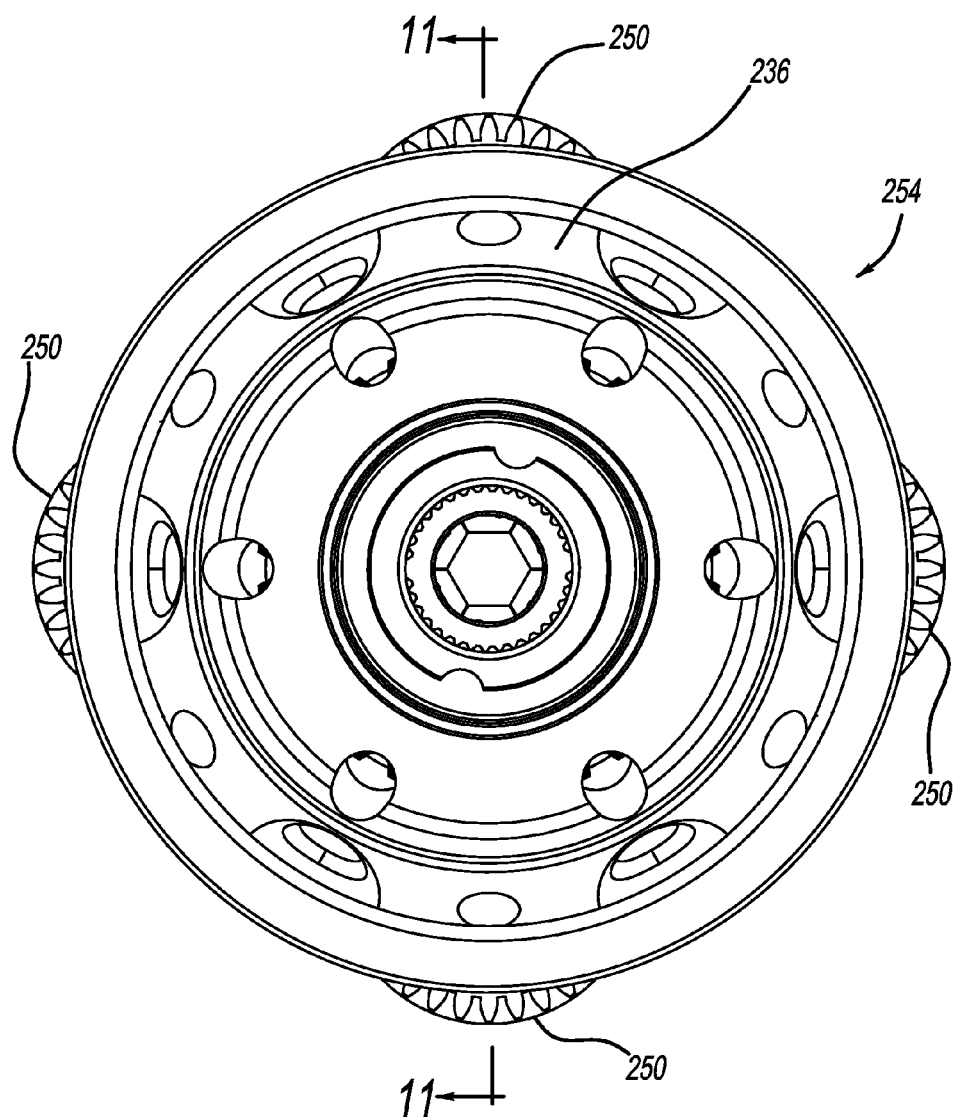
FIG. 10 is a front perspective view of the second differential case portion of FIG. 7.

A plurality of lock pins 210 are received by the plurality of first lock pin engaging surfaces 180 of the first differential case portion 90 and the plurality of second lock pin engaging surfaces 202 of the second differential case portion 94 (FIG. 5). The lock pins 210 shown are non-threaded and cooperate to inhibit relative rotation of the first and second differential case portions 90 and 94. Furthermore, the lock pins 210 cooperate to give strength to the differential case 54 as a whole. The lock pins 210 are disposed at locations in-line with the clutch ear guides 170. Explained further, each clutch ear guide axis 172 and longitudinal plate ear axis 194 intersects a lock pin 210 (FIG. 10).

In this regard, a number of advantages are realized. First, the packaging of the differential case 54 is optimized to provide material at strategic locations around the plate ears 190 and around the lock pins 210. The intersection or parting line of the first and second differential case portions 90 and 94 can carry the full torque to the respective axles 40 and 42 (FIG. 1). The lock pins 210 cooperate to manage the full torque and distribute it around the differential case 54.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A differential gear mechanism comprising:
 differential case having:
  a first differential case portion that defines a first output shaft opening and includes a plurality of clutch ear guides and a plurality of first lock pin engaging surfaces;
  a second differential case portion that defines a second output shaft opening;
 a clutch pack having a plurality of annular plates interleaved between a plurality of annular friction disks, wherein at least one of the annular plates and annular friction disks includes a plurality of radially extending plate ears that are received by the corresponding plurality of clutch ear guides; and
 a plurality of lock pins received by the plurality of first lock pin engaging surfaces of the first differential case at locations in-line with the clutch ear guides, the lock pins disposed between the first and second differential case portions and configured to inhibit relative rotation of the first and second differential case portions.

2. The differential gear mechanism of claim 1 wherein each of the plurality of clutch ear guides are defined along a clutch ear guide axis and wherein each of the plurality of first lock pin engaging surfaces are defined along a first lock pin engaging surface axis, wherein each clutch ear guide axis and corresponding first lock pin engaging surface axis are collinear.

3. The differential gear mechanism of claim 2 wherein all of the plurality of annular plates of the clutch pack include a plurality of radially extending plate ears, wherein the plurality of radially extending plate ears extend along a corresponding plurality of longitudinal plate ear axes, wherein at least one plate ear axis intersects at least one lock pin.

4. The differential gear mechanism of claim 3 wherein each plate ear axis of the plurality of longitudinal plate ear axes intersects a lock pin.

5. The differential gear mechanism of claim 1 wherein the second differential case portion includes a plurality of second lock pin engaging surfaces, wherein the plurality of lock pins are received by the plurality of second lock pin engaging surfaces.

6. The differential gear mechanism of claim 5 wherein the second lock pin engaging surfaces are defined by blind bores formed in the second differential case portion.

7. The differential gear mechanism of claim 1 wherein the lock pins are unthreaded.

8. The differential gear mechanism of claim 7, further comprising a plurality of fasteners that threadably couple the first and second differential case portions together.

9. The differential gear mechanism of claim 8 wherein each lock pin is located radially adjacent to an adjacent fastener.

10. A differential gear mechanism comprising:
 differential case having:
  a first differential case portion that defines a first output shaft opening and includes a plurality of clutch ear guides and a plurality of first lock pin engaging surfaces;
  a second differential case portion that defines a second output shaft opening;
 a clutch pack having a plurality of annular plates interleaved between a plurality of annular friction disks, the clutch pack including a plurality of radially extending plate ears that are received by the corresponding plurality of clutch ear guides, the plurality of radially extending plate ears defined along a corresponding plurality of longitudinal plate ear axes; and
 a plurality of lock pins received by the plurality of first lock pin engaging surfaces of the first differential case, the lock pins disposed between the first and second differential case portions and configured to inhibit relative rotation of the first and second differential case portions, wherein the plurality of longitudinal plate ear axes intersect a corresponding lock pin.

11. The differential gear mechanism of claim 10 wherein each of the plurality of clutch ear guides are defined along a clutch ear guide axis and wherein each of the plurality of first lock pin engaging surfaces are defined along a first lock pin engaging surface axis, wherein each clutch ear guide axis and corresponding first lock pin engaging surface axis are collinear.

12. The differential gear mechanism of claim 10 wherein the second differential case portion includes a plurality of second lock pin engaging surfaces, wherein the plurality of lock pins are received by the plurality of second lock pin engaging surfaces.

13. The differential gear mechanism of claim 12 wherein the second lock pin engaging surfaces are defined by blind bores formed in the second differential case portion.

14. The differential gear mechanism of claim 10 wherein the lock pins are unthreaded.

15. The differential gear mechanism of claim 14, further comprising a plurality of fasteners that threadably couple the first and second differential case portions together.

16. The differential gear mechanism of claim 15 wherein each lock pin is located radially adjacent to an adjacent fastener.

17. A differential gear mechanism comprising:
 differential case having:
  a first differential case portion that defines a first output shaft opening and includes a plurality of clutch ear guides and a plurality of first lock pin engaging surfaces;
  a second differential case portion that defines a second output shaft opening and a plurality of second lock pin engaging surfaces;
 a clutch pack having a plurality of annular plates interleaved between a plurality of annular friction disks, wherein at least one of the annular plates and annular friction disks includes a plurality of radially extending plate ears that are received by the corresponding plurality of clutch ear guides;
 a plurality of non-threaded lock pins received by the plurality of first lock pin engaging surfaces of the first differential case and the plurality of second lock pin engaging surfaces of the second differential case at locations in-line with the clutch ear guides, the lock pins disposed between the first and second differential case portions and configured to inhibit relative rotation of the first and second differential case portions; and
 a plurality of fasteners that threadably couple the first and second differential case portions together.

18. The differential gear mechanism of claim 17 wherein each of the plurality of clutch ear guides are defined along a clutch ear guide axis and wherein each of the plurality of first lock pin engaging surfaces are defined along a first lock pin engaging surface axis, wherein each clutch ear guide axis and corresponding first lock pin engaging surface axis are collinear.

19. The differential gear mechanism of claim 18 wherein all of the plurality of annular plates of the clutch pack include a plurality of radially extending plate ears, wherein the plurality of radially extending plate ears extend along a corresponding plurality of longitudinal plate ear axes, wherein at least one plate ear axis intersects at least one lock pin.

20. The differential gear mechanism of claim 19 wherein each plate ear axis of the plurality of longitudinal plate ear axes intersects a lock pin.

* * * * *